June 11, 1946.  G. A. WALLER  2,401,992
OVERLOAD CLUTCH
Filed July 19, 1944  2 Sheets-Sheet 1
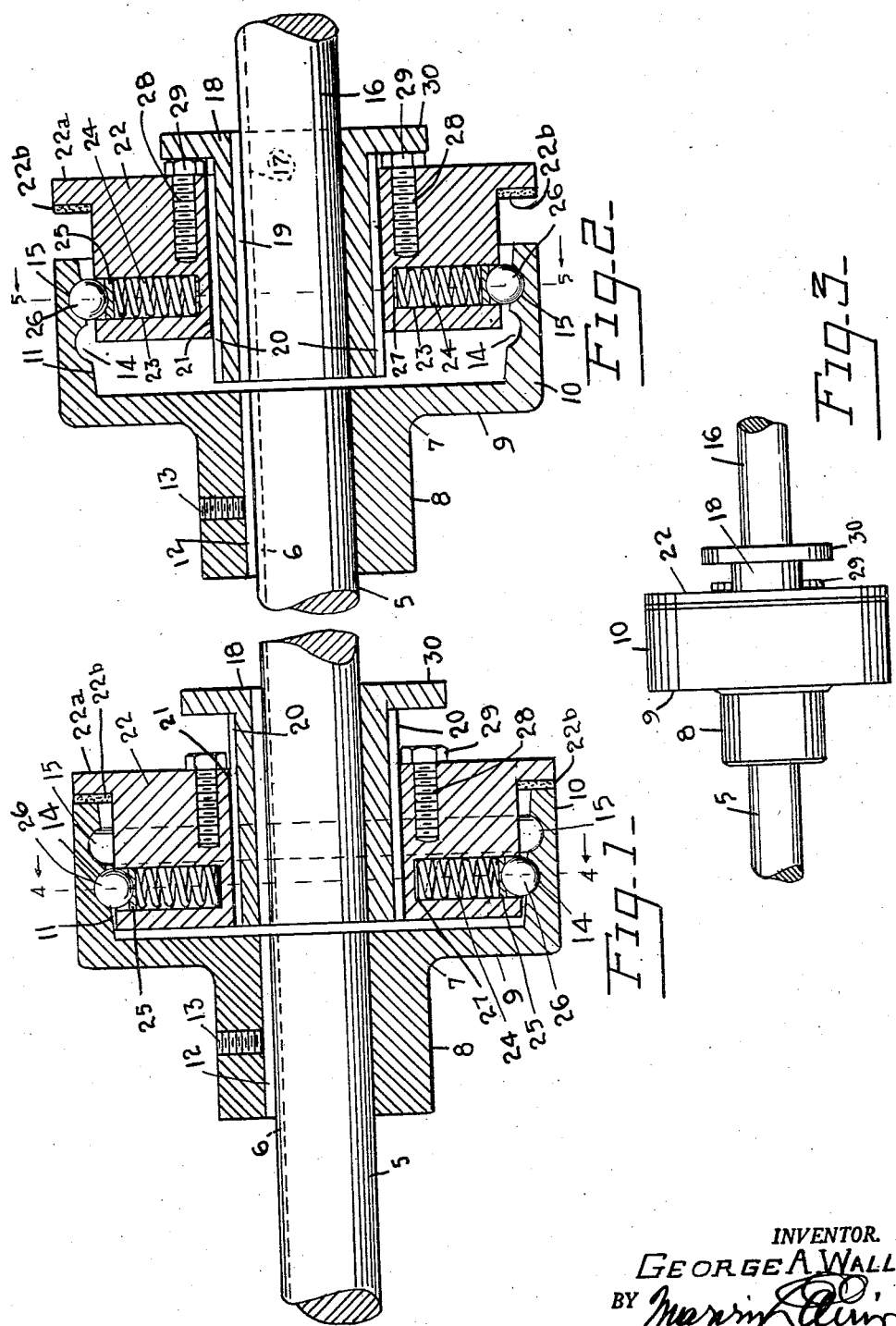
INVENTOR.
GEORGE A. WALLER
BY
ATTORNEY June 11, 1946.  G. A. WALLER  2,401,992
OVERLOAD CLUTCH
Filed July 19, 1944  2 Sheets-Sheet 2

INVENTOR.
GEORGE A. WALLER
BY
ATTORNEY

Patented June 11, 1946

2,401,992

UNITED STATES PATENT OFFICE 2,401,992

OVERLOAD CLUTCH

George A. Waller, Mount Vernon, N. Y.

Application July 19, 1944, Serial No. 545,621

3 Claims. (Cl. 192—56)

This invention relates to an improved overload clutch and one of its objects is to provide a clutch of this type, wherein coupling for driving connection between the companion clutch units or parts is developed by the use of bearing balls held in working position by expansion springs, and separation or uncoupling takes place under the overload on the drive when the bearing balls are displaced from their coupling position and then enter a raceway which thus permits free running, while the springs are permitted to slightly expand.

Another object of the invention is to provide an overload clutch of this type with means for forcing the coupling bearing balls to their coupling position and out of the raceway.

A still further object of the invention is the provision of a clutch of this type, with interfitting units, one of which is formed with an interior conical surface and constructed with coupling sockets to receive the bearing balls and a raceway located in a portion of the conical surface outwardly of the coupling sockets which has a larger internal diameter than the diameter through the coupling sockets, so that a smooth release will be obtained when an overload develops.

With the above and other objects in view the invention relates to certain new and useful constructions, combinations and arrangements of parts, clearly described in the following specification, and fully illustrated in the drawings, in which:

Fig. 1 is a longitudinal sectional view through the clutch with the companion units shown in coupled relation for driving.

Fig. 2 is a similar view showing the clutch units separated and the bearing balls in the raceway.

Fig. 3 is a side elevation, showing the clutch in coupled position.

Figure 4:
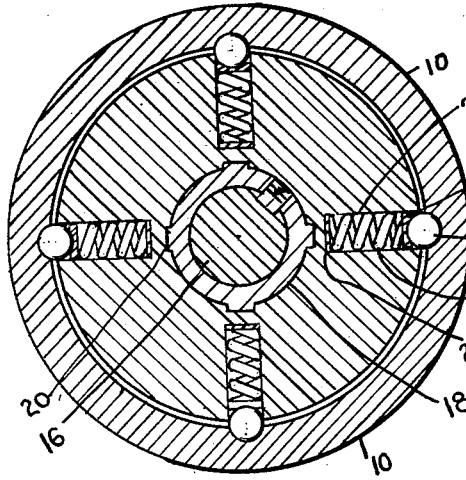
Fig. 4 is a transverse sectional view taken on line 4—4 of Fig. 1, looking in the direction of the arrows.
Figure 5:
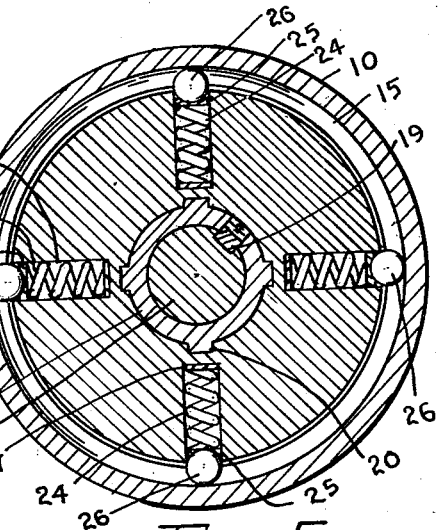
Fig. 5 is a similar view, taken on line 5—5 of Fig. 2, looking in the direction of the arrows.
Figure 6:
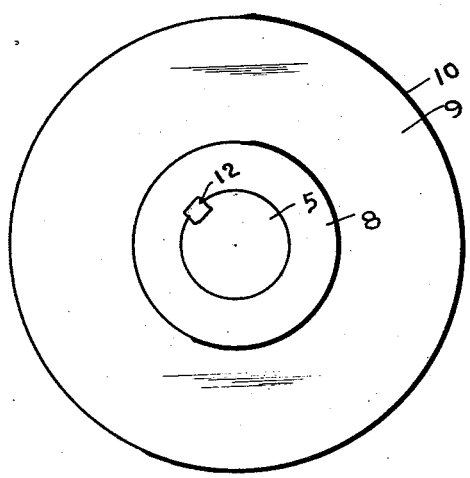
Fig. 6 is an end view of one of the clutch units.
Figure 7:
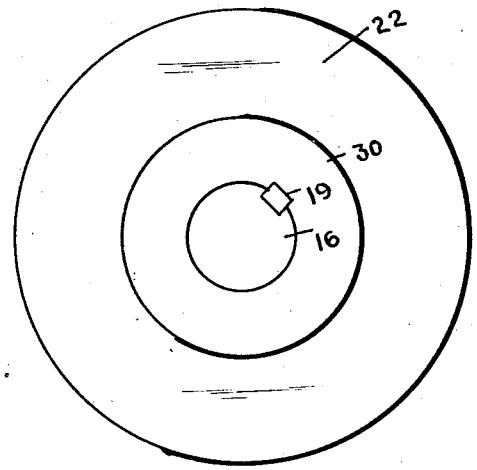
Fig. 7 is an end view of the other clutch unit.

Referring to the accompanying drawings which illustrate my invention 5 designates a shaft and 6 its keyway. On this shaft the clutch unit 7 is mounted, and this unit includes the hub 8, the circular and concentric end wall or flange 9, and the ring 10, integral with the wall or flange 9, which is formed with a conical internal surface 11. The hub is coupled to the shaft 5 by means of the key 12, and this key is held in coupling relation by means of the set screw 13.

The clutch ring 10 is formed with a plurality of circumferentially spaced ball receiving sockets 14, arranged in spaced relation to the end wall or flange 9, and is also formed with a ball raceway 15, located in parallel relation to the transverse plane through all of the sockets, and spaced outwardly of these sockets in the larger internal diameter of the conical surface 11.

The companion shaft 16 is formed with a keyway 17 and a sleeve 18 has a driving fit with this shaft and is coupled thereto by means of the key 19 so as to rotate with the shaft. This sleeve is formed with external splines 20, spaced circumferentially from each other, and which have sliding engagement with the splineways 21 formed in the sliding clutch ring 22.

The clutch ring 22 is formed with a series of radial sockets 23, spaced equally from each other at right angles to the axis of rotation of the ring in the same transverse plane, and in each of these radial sockets an expansion coiled spring 24 is disposed. The inner end of each socket is closed and the outer end is open. Against the outer end of each spring a hardened washer 25 is placed, which is formed with a concave face on one side to form a bearing for the hardened bearing ball 26, which is slightly smaller in diameter than the socket itself. In order to adjust the pressure developed by the expansion springs I may place a shim disc 27 at the inner end of each spring, or one or more of said discs, or use springs made from thicker or thinner wire, in order to obtain the proper or required spring pressure.

The bearing balls are adapted to engage the ball sockets 14, which are spaced in the ring 10 equally with the sockets 23, so that the balls will snap into the sockets and have accurate bearing engagement therewith. In this coupled relation the ring 10 will be coupled to the ring 22, so that the two rings will rotate together, and motion will be transferred from the driving shaft 5 to the driven shaft 16.

When an overload develops in the driving of the shaft 16 the bearing balls will be forced inwardly, subjecting the springs to increased tension for the moment and will then spring into the raceway 15, allowing the ring 10 to ride freely on the ring 22, and entirely uncoupling the ring 22 and its shaft 16 from the ring 10 and its driving shaft 5.

The burden imposed by the overload upon the clutch may be definitely determined in advance, so that the clutch will automatically uncouple under any given overload, and allow the companion clutch units to turn freely on each other, and thus avoid serious injury to mechanism operated by the driven shaft. By merely selecting the correct expansion springs, or using shim discs, the clutch may be adapted to wide variations of overload requirements.

When the two clutch rings 10 and 22 have been uncoupled from each other and it is required that they be against coupled for driving engagement, it is necessary to force the sliding clutch ring 22 on its sleeve, against the resistance offered by the expansion springs. I therefore provide a series of screws 28, which are threaded into the outer end of the ring 22, and are provided with hexagonal or other wrench heads 29, which are normally engaged with the outer end of the ring 22. The outer end of the sleeve 18 is formed with an integral end flange 30 which the heads 29 of the screws are adapted to engage when the screws are threaded outwardly, so as to develop pressure against the ring 22 to force it along the sleeve, thereby forcing the balls inwardly against the resistance of the springs, until the movement of the sleeve 22 reaches a point where the bearing balls can again spring into their coupling sockets. The two clutch units may again be coupled by this simple operation.

In order to absorb the shock due to the springing of the bearing balls into the coupling sockets, I provide a thrust flange 22a on the sliding ring 22, and a leather, asbestos, fibre, rubber or other shock absorbing ring on the inner side of this thrust flange, which is adapted to engage the outer end of the ring 10 when the two clutch rings are in clutch coupled relation to each other.

It is understood that various changes may be made in the design and construction of the improved overload clutch, without departing from the scope of the invention as defined in the claims of this application.

Having described my invention I claim as new:

1. An overload clutch consisting of a sleeve having external splines, a clutch ring having splineways sliding on the splines of the sleeve, a second clutch ring, one of said clutch rings fitting inside of the other of said clutch rings, one of said rings having a series of radially disposed sockets opening through the outer surface of the ring, expansion springs in said sockets, bearing balls engaging the outer ends of said springs, the other ring having a series of ball receiving sockets of semispherical form adapted to form driving coupling means with said balls, and a relief channel for the balls in said other ring.

2. An overload clutch consisting of a shaft, a clutch ring mounted on the shaft to rotate therewith, said ring having an internal conical surface and provided with a series of semispherical ball receiving sockets equally spaced apart in a plane at right angles to the axis of said shaft and further provided with a raceway parallel to the series of sockets and spaced therefrom, a second shaft, a sleeve mounted on the second shaft to rotate therewith, said sleeve having external splines, a second clutch ring slidably interlocked with the sleeve splines, said second ring having a series of radial sockets equally spaced from each other, expansion springs in said sockets, and bearing balls engaging the outer ends of said expansion springs, said balls being adapted to engage said first-named sockets to couple the two clutch rings for driving engagement and to engage the raceway when said balls are displaced from said first-named sockets.

3. An overload clutch comprising a sleeve adapted to be coupled with a drive shaft and provided with external splines, said sleeve also having a flange on one end thereof, a clutch ring slidably engaging the splines of the sleeve and provided with radial sockets spaced apart from each other equal distances, a second clutch ring having a hub adapted to be secured to a driven shaft and provided with an inner conical wall adapted to overlap the clutch ring, said second clutch ring having a plurality of radial sockets registerable with the radial sockets of the first-named clutch ring which are adapted to receive hard bearing balls, a spring pressed bearing ball in each of the radial sockets of the first-named clutch ring adapted to engage the sockets of said second clutch ring, said second named clutch ring having a circular raceway disposed outwardly of the sockets thereof and said bearing balls being adapted to engage said raceway when said balls are displaced from said ball receiving sockets of the second named clutch ring under an overload and the radial distance between the axis of the shafts and the raceway being greater than the radial distance between the axis of the shafts and the ball receiving sockets, and means for limiting the sliding movement of the first-named clutch ring on said sleeve.

GEORGE A. WALLER.